(12) United States Patent
Khakhalev et al.

(10) Patent No.: US 8,551,638 B2
(45) Date of Patent: Oct. 8, 2013

(54) BATTERY PACK HAVING WELDED CELL TAB AND INTERCONNECT ASSEMBLY

(76) Inventors: Alexander D. Khakhalev, Troy, MI (US); Donn W. Glander, Grosse Pointe Woods, MI (US)

(*) Notice: Subject to any disclaimer, the term of this patent is extended or adjusted under 35 U.S.C. 154(b) by 758 days.

(21) Appl. No.: 12/509,035

(22) Filed: Jul. 24, 2009

(65) Prior Publication Data

US 2011/0020694 A1    Jan. 27, 2011

(51) Int. Cl.
*H01M 10/02* (2006.01)
*H01M 2/02* (2006.01)
*H01M 2/20* (2006.01)
*H01M 2/22* (2006.01)
*B23K 20/12* (2006.01)
*B23K 31/02* (2006.01)

(52) U.S. Cl.
USPC ........... 429/149; 429/156; 429/158; 429/160; 228/112.1; 228/114.5; 228/2.1

(58) Field of Classification Search
USPC ........... 429/149, 152–161; 228/112.1–114.5, 228/2.1–2.3
See application file for complete search history.

(56) References Cited

U.S. PATENT DOCUMENTS

| | | | |
|---|---|---|---|
| 3,805,014 A * | 4/1974 | Becker | 219/92 |
| 4,093,785 A * | 6/1978 | Sassmannshausen et al. | 429/149 |
| 6,255,015 B1 * | 7/2001 | Corrigan et al. | 429/149 |
| 2003/0121142 A1 * | 7/2003 | Kikuchi et al. | 29/623.4 |
| 2005/0130035 A1 * | 6/2005 | Inada et al. | 429/161 |
| 2007/0029368 A1 * | 2/2007 | Kubouchi et al. | 228/112.1 |
| 2009/0162747 A1 * | 6/2009 | Zhu et al. | 429/160 |

* cited by examiner

*Primary Examiner* — Jonathan Crepeau
*Assistant Examiner* — Jacob Buchanan

(57) ABSTRACT

A battery pack for use in a vehicle may comprise battery cells, with each of the battery cells including a main body and a foil cell tab extending from the main body, with the battery cells arranged into a first set and a second set; an interconnect having a first leg, a second leg, and a bridge connecting the legs; first weld locations securing the foil cell tabs of the first set of battery cells to the first leg; and second weld locations securing the foil cell tabs of the second set of battery cells to the second leg. The foil cell tabs or the legs of the interconnect or both may include relief slots extending between the weld locations. Also, the thickness of a set of the tabs may be equal to the thickness of the leg to which they are welded.

7 Claims, 2 Drawing Sheets

BATTERY PACK HAVING WELDED CELL TAB AND INTERCONNECT ASSEMBLY

BACKGROUND OF INVENTION

The present invention relates generally to welding of components in a vehicle battery pack.

Increasing numbers of automotive vehicles are being produced that require the use of relatively large battery packs, such as, for example, hybrid electric, plug-in hybrid electric, battery electric, and fuel cell vehicles. The battery packs in these vehicles may require a large number of welds to attach various components together. It is desirable, then, to assemble the battery packs with components and welds that are cost effective, reliable, durable and resist degradation from the environment in which these vehicle battery packs operate. The environment may include, for example, vibrations, a significant range of operating temperatures, and moisture from condensation of water vapor.

SUMMARY OF INVENTION

An embodiment contemplates a battery pack for use in a vehicle. The battery pack may comprise a plurality of battery cells, with each of the battery cells including a main body and a foil cell tab extending from the main body, with the plurality of battery cells arranged into a first set and a second set; an interconnect having a first leg and a second leg spaced from the first leg, and a bridge connecting the first leg to the second leg; a plurality of first weld locations securing the foil cell tabs of the first set of battery cells to the first leg; and a plurality of second weld locations securing the foil cell tabs of the second set of battery cells to the second leg. The foil cell tabs of the first set of battery cells may include a plurality of foil relief slots, with each of the foil relief slots extending between a respective pair of the first weld locations. The foil cell tabs of the second set of battery cells may include a plurality of foil relief slots, with each of the foil relief slots of the second set of battery cells extending between a respective pair of the second weld locations.

An embodiment contemplates a battery pack for use in a vehicle that may comprise a plurality of battery cells, with each of the battery cells including a main body and a foil cell tab extending from the main body, the plurality of battery cells arranged into a first set and a second set; an interconnect having a first leg and a second leg spaced from the first leg, and a bridge connecting the first leg to the second leg; a plurality of first weld locations securing the foil cell tabs of the first set of battery cells to the first leg; and a plurality of second weld locations securing the foil cell tabs of the second set of battery cells to the second leg. The first leg may include a plurality of relief slots, with each relief slot extending between a respective pair of the first weld locations, and the second leg may include a plurality of relief slots, with each of the relief slots of the second leg extending between a respective pair of the second weld locations.

An embodiment contemplates a method of forming a cell tab and interconnect assembly for a battery pack having a plurality of battery cells, the method comprising the steps of: forming a first set of foil cell tabs from a first set of the battery cells; forming a second set of foil cell tabs from a second set of the battery cells; forming a plurality of first relief slots in at least one of the first set of foil cell tabs and a first leg of an interconnect; forming a plurality of second relief slots in at least one of the second set of foil cell tabs and a second leg of the interconnect; ultrasonically welding the first set of foil cell tabs to the first leg of the interconnect at welding locations between the first relief slots; and ultrasonically welding the second set of foil cell tabs to the second leg of the interconnect at welding locations between the second relief slots.

An advantage of an embodiment is that the relief slots may reduce the risk of metal deformation and stress concentrations that may cause fatigue cracking after welding the foil cell tabs to the interconnect. Another advantage of an embodiment is that pockets (gaps between the foil cell tabs and interconnect between welds) are eliminated, thus reducing the risk of accumulation of moisture that can lead to electrolytic corrosion. An advantage of an embodiment is that, by having the thickness of the interconnect leg approximately equal to the total thickness of the foil cell tabs which that leg is welded to, the weld quality will not be reduced due to manufacturing variations, such as misalignment relative to an ultrasonic welding anvil and horn. Moreover, rotational movement during a clamping process prior to welding is reduced, thus reducing undesirable stress in opposite side prior placed welds and the foil cell tabs themselves.

DETAILED DESCRIPTION

Figure 1:
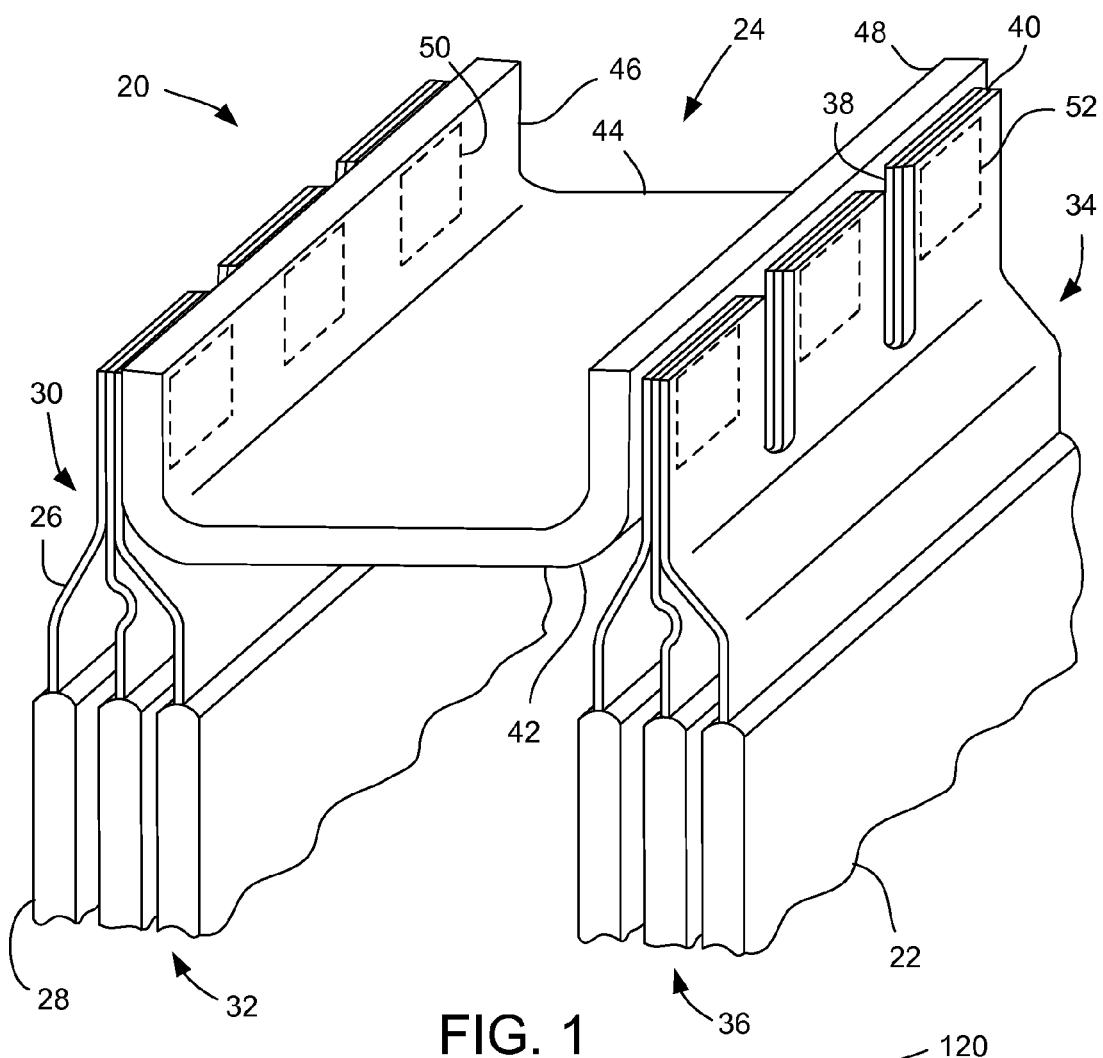
FIG. 1 is a schematic, perspective view of a cell tab and interconnect assembly.

FIG. 1 illustrates a portion of a battery pack 20 for use in a vehicle (not shown). The battery pack 20 includes many battery cells 22, six of which are shown in FIG. 1. The various sets of battery cells 22 are connected together using cell tab and interconnect assemblies 24, which are welded together. For example, a single plug-in hybrid electric vehicle may include dozens of the battery cells, so this vehicle may have hundreds of weld locations on the cell tab and interconnect assemblies 24.

Each battery cell 22 includes a foil cell tab 26 extending from a main body 28. The foil cell tabs 26 are grouped together into sets that are sandwiched together. For example, a first set 30 of three foil cell tabs 26 may be made of aluminum and extend upward from a first set 32 of cells 22, and a second set 34 of three foil cell tabs 26 may be made of nickel plated copper and extend upward from a second set 36 of cells 22. Each foil cell tab 26 includes relief slots 38 that extend from an upper end 40 and are located to be between locations where welding of the tabs 26 to an interconnect 42 will occur.

The interconnect 42 may be made of nickel plated copper or aluminum and includes a bridge 44 having a first leg 46 extending upward from a first side and a second leg 48 extending upward from an opposed side of the bridge 44. The first leg 46 is welded to the first set 30 of foil cell tabs 26 at first weld locations 50. These weld locations 50 may be produced by ultrasonic welding, where an anvil (not shown) may be placed adjacent to the first interconnect leg 46 and a horn (not shown) may be placed adjacent to the set 30 of foil cell tabs 26. The second leg 48 is welded to the second set 34 of foil cell tabs 26 at second weld locations 52. These weld locations 52 also may be produced by resistance welding.

The cell tab and interconnect assemblies 24 include the interconnect 42 welded to the foil cell tabs 26. The relief slots 38 between the weld locations 50, 52 may act to relieve stress in the cell tab and interconnect assembly 24 after the welding process has occurred. The relief slots 38 may also help to produce a more uniform heat distribution across the three adjacent welds (50 or 52, as the case may be) while being formed, which may improve weld quality. Moreover, since one set of the first or second weld locations will be welding dissimilar metals, the relief slots 38 will prevent moisture build up that might otherwise occur between the welds, thus avoiding concerns with electrolytic corrosion.

Figure 2:
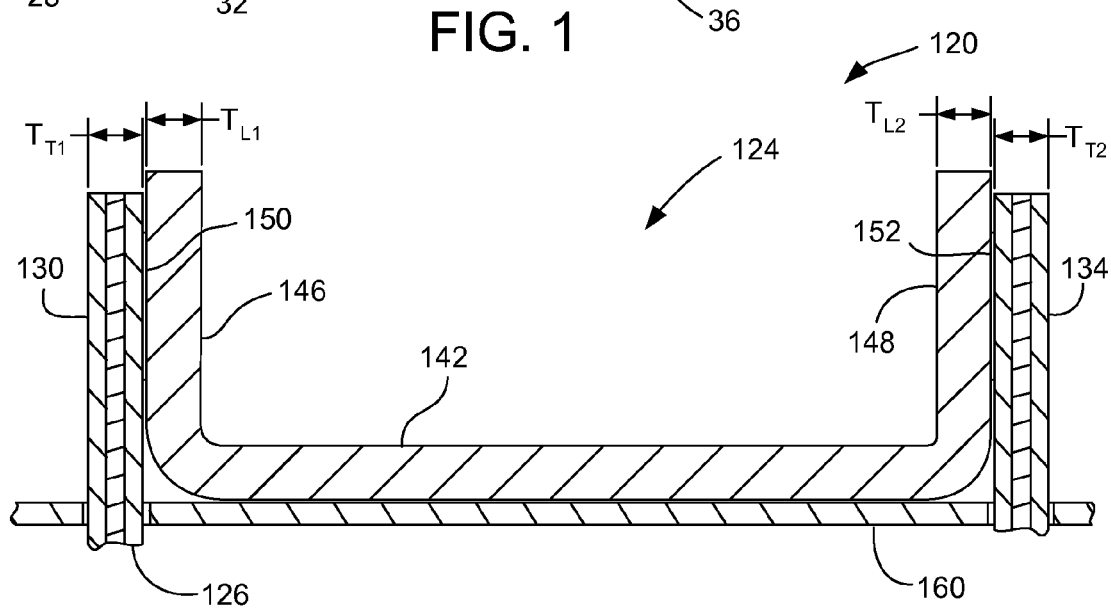
FIG. 2 is a schematic, side sectional view of a portion of a cell tab and interconnect assembly, including a sensor board.

FIG. 2 illustrates a second embodiment of the cell tab and interconnect assembly 124. In this embodiment, similar elements are similarly designated with the first embodiment but falling within the 100-series. A total thickness $T_{T1}$ of the first set 130 of foil cell tabs 126 is equal to or slightly thicker than a thickness $T_{L1}$ of the first leg 146 of the interconnect 142, and a total thickness $T_{T2}$ of the second set 134 of foil cell tabs 126 is equal to or slightly thicker than a thickness $T_{L2}$ of the second leg 148 of the interconnect 142. This allows for the legs 146, 148 to more easily adjust during anvil clamping in order to provide equal pressure over the weld locations 150, 152. This reduction in stress, in turn, minimizes the potential for bending or warping of a sensor board 160 (shown only in FIG. 2) of the battery pack 120, as well as providing consistently good sonic energy transfer for predictable, high quality ultrasonic welds.

Figure 3:
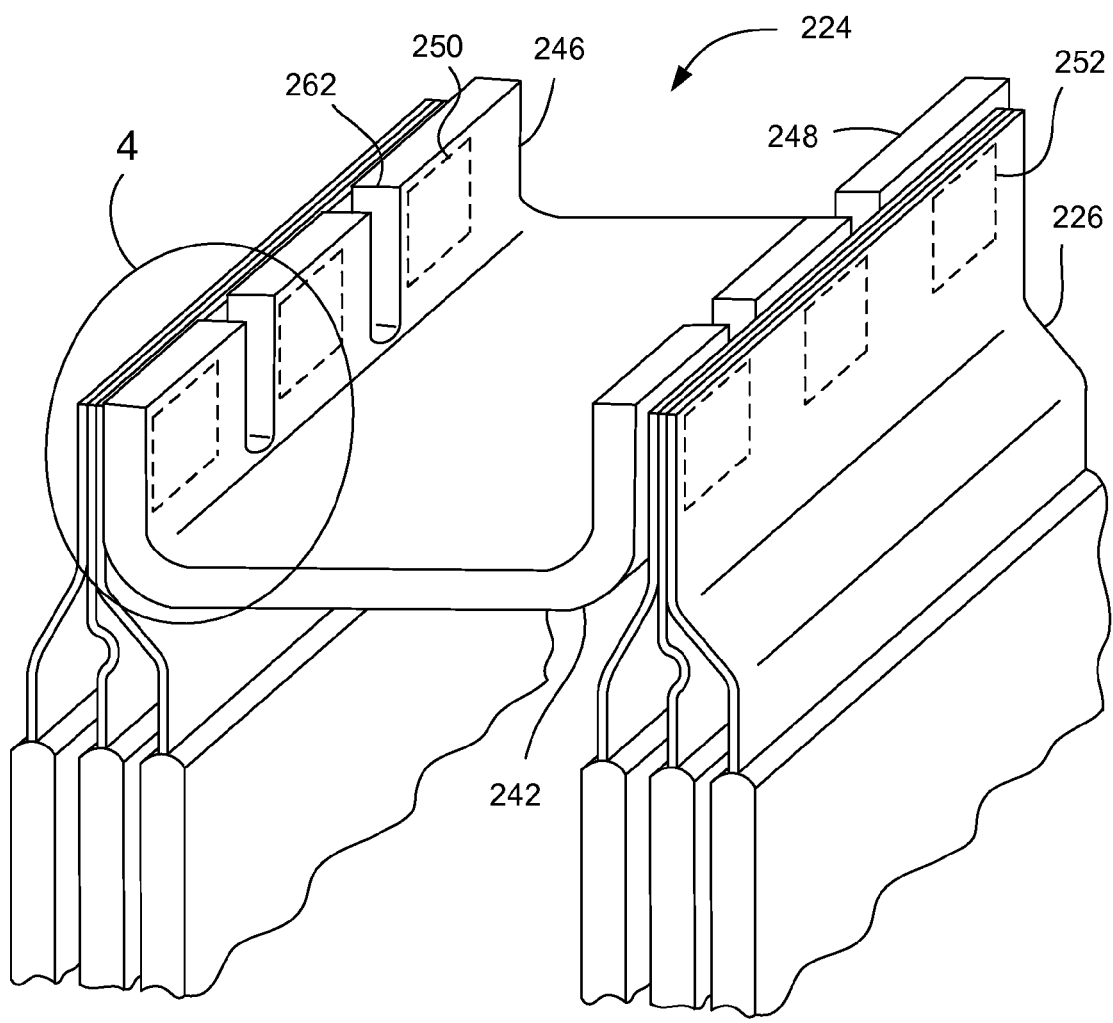
FIG. 3 is a view similar to FIG. 1, but illustrating a third embodiment.

FIG. 3 illustrates a third embodiment of the cell tab and interconnect assembly 224. In this embodiment, similar elements are similarly designated with the first embodiment but falling within the 200-series. As distinguished from the first embodiment, relief slots 262 are now located in the first and second legs 246, 248 of the interconnect 242 rather than in the foil cell tabs 226. The relief slots 262 are still located between the weld locations 250, 252 in order to provide stress relief between the weld locations.

Figure 4:
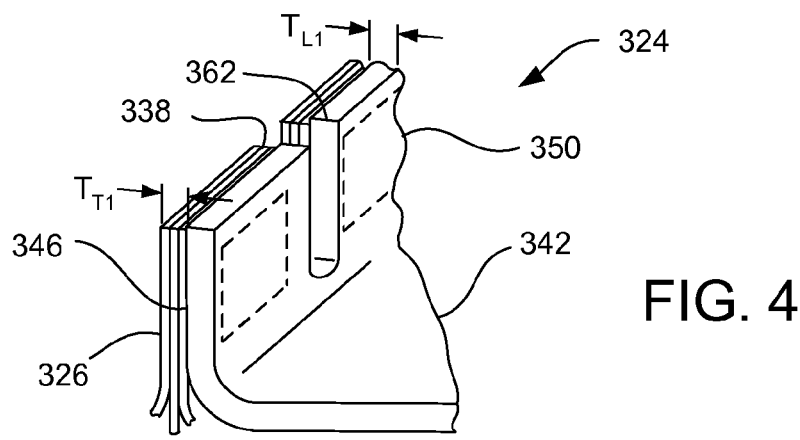
FIG. 4 is a view taken from encircled area 4 in FIG. 3, but illustrating a fourth embodiment.

FIG. 4 illustrates a fourth embodiment of the cell tab and interconnect assembly 324. In this embodiment, similar elements are similarly designated with the previous embodiments but falling within the 300-series. Both the foil cell tabs 326 (only three shown) and the legs 346 (only one leg shown) of the interconnect 342 have relief slots 338, 362, respectively. The relief slots 338, 362 are located adjacent to each other between the weld locations 350 in order to provide stress relief. Also, the thickness $T_{T1}$ of the first set of tabs is equal to the thickness $T_{L1}$ of the first leg 346. The same is true for the second leg and second set (not shown in FIG. 4). Thus, the welds can be produced at the weld locations 350 while minimizing stresses in the cell tab and interconnect assembly 324.

While certain embodiments of the present invention have been described in detail, those familiar with the art to which this invention relates will recognize various alternative designs and embodiments for practicing the invention as defined by the following claims.

What is claimed is:

1. A battery pack for use in a vehicle comprising:
   a plurality of battery cells, with each of the battery cells including a main body and a foil cell tab extending from the main body, the plurality of battery cells arranged into a first set, having a plurality of the foil cell tabs in surface contact, and a second set, having a plurality of the foil cell tabs in surface contact;
   an interconnect having a first leg and a second leg spaced from the first leg, and a bridge connecting the first leg to the second leg;
   a plurality of first friction welds securing the foil cell tabs of the first set of battery cells together and securing only one of the foil cell tabs of the first set to the first leg; and
   a plurality of second friction welds securing the foil cell tabs of the second set of battery cells together and securing only one of the foil cell tabs of the second set to the second leg;
   wherein the foil cell tabs of the first set of battery cells include a plurality of foil relief slots, with each of the foil relief slots extending between a respective pair of the first friction welds, and the foil cell tabs of the second set of battery cells include a plurality of foil relief slots, with each of the foil relief slots of the second set of battery cells extending between a respective pair of the second friction welds;
   wherein a total thickness of all of the foil cell tabs in the first set of battery cell is equal to a thickness of the first leg of the interconnect.

2. The battery pack of claim 1 wherein the first leg includes a plurality of interconnect relief slots, with each of the interconnect relief slots extending between a respective pair of the first friction welds, and the second leg includes a plurality of interconnect relief slots, with each of the interconnect relief slots of the second leg extending between a respective pair of the second friction welds.

3. The battery pack of claim 2 wherein a total thickness of all of the foil cell tabs in the second set of battery cells is equal to a thickness of the second leg of the interconnect.

4. The battery pack of claim 1 wherein a total thickness of all of the foil cell tabs in the second set of battery cells is equal to a thickness of the second leg of the interconnect.

5. The battery pack of claim 1 wherein the foil cell tabs in the first set of battery cells is made of aluminum, the interconnect is made of a nickel plated copper and the foil cell tabs in the second set of battery cells is made of nickel plated copper.

6. A battery pack for use in a vehicle comprising:
   a plurality of battery cells, with each of the battery cells including a main body and a foil cell tab extending from the main body, the plurality of battery cells arranged into a first set, having a plurality of the foil cell tabs in surface contact, and a second set, having a plurality of the foil cell tabs in surface contact;
   an interconnect having a first leg and a second leg spaced from the first leg, and a bridge connecting the first leg to the second leg;
   a plurality of first friction welds securing the foil cell tabs of the first set of battery cells together and securing only one of the foil cell tabs of the first set to the first leg; and
   a plurality of second friction welds securing the foil cell tabs of the second set of battery cells together and securing only one of the foil cell tabs of the second set to the second leg;
   wherein the first leg includes a plurality of relief slots, with each relief slot extending between a respective pair of the first friction welds, and the second leg includes a plurality of relief slots, with each of the relief slots of the second leg extending between a respective pair of the second friction welds;
   wherein a total thickness of all of the foil cell tabs in the first set of battery cells is equal to a thickness of the first leg of the interconnect.

7. The battery pack of claim 6 wherein a total thickness of all of the foil cell tabs in the second set of battery cells is equal to a thickness of the second leg of the interconnect.

\* \* \* \* \*